United States Patent [19]
Sastre et al.

[11] Patent Number: 6,044,525
[45] Date of Patent: Apr. 4, 2000

[54] FASTENER STRAPS

[75] Inventors: Jordi Blade Sastre, Mataro; Mireia Musquera Ferrer, Sant Andreu de Llavaneres, both of Spain; William Clune, Concord, N.H.; Samuel W. Pollard, Durham, N.H.; Clifton Wall, Nashua, N.H.

[73] Assignee: Velcro Industries B.V., Curacao, Netherlands Antilles

[21] Appl. No.: 09/206,049

[22] Filed: Dec. 4, 1998

[51] Int. Cl.[7] .................................................. B65D 63/00
[52] U.S. Cl. ..................... 24/20 R; 24/16 PB; 24/20 EE; 24/17 AP; 24/306
[58] Field of Search .................................. 24/306, 30 SP, 24/16 PB, 16 R, 20 R, 20 EE, 17 AP, 30.5 S, 22, 23 B; 206/343, 345, 338

[56] References Cited

U.S. PATENT DOCUMENTS

| | | | |
|---|---|---|---|
| 165,407 | 7/1875 | Dawson | 24/16 PB X |
| 427,355 | 5/1890 | McLaren, Jr. | 24/20 EE |
| 487,145 | 11/1892 | Gibbons | 24/20 EE X |
| 1,945,932 | 2/1934 | Caley | 24/17 AP X |
| 3,197,830 | 8/1965 | Hoadley . | |
| 3,261,100 | 7/1966 | Quenot | 24/16 PB X |
| 3,279,008 | 10/1966 | Wallach | 24/16 PB |
| 3,426,363 | 2/1969 | Girard . | |
| 3,780,921 | 12/1973 | Harp | 493/342 |
| 3,973,610 | 8/1976 | Ballin . | |
| 4,477,950 | 10/1984 | Cisek et al. | 24/30.5 P |
| 4,893,381 | 1/1990 | Frankel . | |
| 4,896,402 | 1/1990 | Jansen et al. | 24/23 B X |
| 4,939,818 | 7/1990 | Hahn . | |
| 5,048,158 | 9/1991 | Koerner . | |
| 5,133,671 | 7/1992 | Boghosian . | |
| 5,260,015 | 11/1993 | Kennedy et al. . | |
| 5,312,387 | 5/1994 | Rossini et al. . | |
| 5,603,708 | 2/1997 | Seth . | |
| 5,759,317 | 6/1998 | Justmann . | |
| 5,802,676 | 9/1998 | Tolan . | |
| 5,870,849 | 2/1999 | Colson, Jr. | 24/306 X |

FOREIGN PATENT DOCUMENTS 0 379 850 8/1990 European Pat. Off. .
0 826 354 3/1998 European Pat. Off. .

*Primary Examiner*—James R. Brittain
*Assistant Examiner*—Robert J. Sandy
*Attorney, Agent, or Firm*—Fish & Richardson P.C.

[57] ABSTRACT

A fastener strap sheet is provided that includes (a) a sheet material having a first surface and a second surface substantially opposite the first surface, the first surface being constructed for face-to-face cooperating engagement with the second surface; and (b) a pattern of cuts extending through the sheet material, the cuts defining an array of fastener straps, each fastener strap including an elongated body having a predetermined width, and a head portion at one end of the body having a width greater than the predetermined width and defining an opening through which the strap body can be pulled. The array of straps define a first set of straps and a second set of straps, the heads of the first set, being located on a first side of the array and the heads of the second set being located on a second, opposite side of the array, and the bodies of the first set being directly bordered by and parallel with the bodies of the second set, in an interdigitated arrangement.

30 Claims, 7 Drawing Sheets

FASTENER STRAPS

BACKGROUND OF THE INVENTION

The invention relates to fastener straps, e.g., straps for bundling cables, cords and wire, and to methods of making such straps.

As shown in FIG. 1, a typical fastener strap 10 includes a relatively wide head 12 defining an opening 14, and an elongated strap body 16 having an end 18 that is dimensioned to fit through opening 14, allowing the strap to be cinched around an article.

Fastener straps are used in many different applications. One such application, for example, is the "bundling" of cord-like materials, such as wire, electrical cord and telephone cable. A cord-like material 15 is secured in a bundle, as shown in FIG. 1A, by wrapping the fastener strap 10 around a portion of the material 15, inserting the end 18 through opening 14, pulling the free end 17 until the strap body 16 is wrapped tightly around the material 15, and securing the free end in this position.

Various means have been used to secure the free end in place, one of which is to provide the hook component of a hook and loop fastener on one surface of the strap, and the hook-engaging loop component of the hook and loop fastener on the opposite surface. In this manner, when the free end 17 is pulled tight through the opening 14 it can then be overlapped with and pressed down against the underlying portion of the strap body 16, thereby engaging the hook-bearing surface of the strap body 16 with the opposite loop-bearing surface.

Fastener straps are generally manufactured by die-cutting a pattern defining an array of fastener straps into a sheet material, and separating the individual fastener straps from the sheet material. An example of a die-cutting pattern 20, defining two arrays 11 of fastener straps 10, is shown in FIG. 2. One strap 10 is cross-hatched for illustration. Each array is arranged so that all of the heads 12 are facing in the same direction. The entire area 22 surrounding the fasteners 10 is waste material and is generally discarded.

SUMMARY OF THE INVENTION

In one aspect, the invention features a fastener strap sheet that includes (a) a sheet material having a first surface and a second surface substantially opposite the first surface, the first surface being constructed for face-to-face cooperating engagement with the second surface; and (b) a pattern of cuts extending through the sheet material, the cuts defining an array of fastener straps, each fastener strap including an elongated body having a predetermined width, and a head portion at one end of the body having a width greater than the predetermined width and defining an opening through which the strap body can be pulled. The array of straps define a first set of straps and a second set of straps, the heads of the first set being located on a first side of the array and the heads of the second set being located on a second, opposite side of the array, and the bodies of the first set being directly bordered by and parallel with the bodies of the second set, in an interdigitated arrangement.

Preferred implementations of the invention include one or more of the following features. A terminal portion of each elongated body includes a tail having a width that is less than the predetermined width of the elongated body. The heads of the first set are directly bordered by the tails of the second set, and the tails of the first set are directly bordered by the heads of the second set. The cuts further define a second array of fastener straps, and the second array of fastener straps is disposed in an end-to-end relationship with the first array, the two arrays defining rows of collinear fastener straps, in which, in alternating rows, the heads of the first array are directly bordered by the tails of the second array, and the tails of the first array are directly bordered by the heads of the second array. Each tail includes a tab at a terminal end of the tail and a necked-in region extending from the tab towards the head. The first surface of the sheet material carries an array of hooks and the second surface of the sheet material is constructed for engagement with the hooks. The second surface of the sheet material carries an array of hook-engaging loops.

In another aspect, the invention features a fastener strap including a portion of sheet material having a first surface and a second surface substantially opposite the first surface, the first surface being constructed for face-to-face cooperating engagement with the second surface. The sheet material is shaped to define: (a) an elongated body having a predetermined width; (b) a head portion at one end of the body having a width greater than the predetermined width, and defining an opening through which the strap body can be pulled; and (c) a tail portion at an opposite end of the body, having a width less than the predetermined width, the tail being dimensioned for insertion through the opening.

Preferred implementations of the invention include one or more of the following features. The tail includes a tab at a terminal end of the tail and a necked-in-region extending from the tab towards the head. The tab has a width that is equal to or slightly greater than the width of the opening, and the necked-down region has a width that is less than the width of the opening. The first surface of the sheet material carries an array of hooks and the second surface of the sheet material is constructed for engagement with the hooks. The second surface of the sheet material carries an array of hook-engaging loops.

In yet another aspect, the invention features a fastener strap including a portion of sheet material having a first surface and a second surface substantially opposite the first surface, the first surface being constructed for face-to-face cooperating engagement with the second surface. The sheet material is shaped to define: (a) an elongated body having a predetermined width; (b) a head portion at one end of the body having a width greater than the predetermined width, and defining an opening through which the strap body can be pulled; and (c) a tail at an opposite end of the body, the tail being dimensioned for insertion through the opening and including a region of the sheet material that has been rendered incapable of face-to-face cooperating (engagement with the opposite surface of the sheet material.

Preferred implementations include one or more of the following features. The region is constructed to be grasped by a user to facilitate disengagement of the first surface of the sheet material from the second surface when the two surfaces are in face-to-face engagement. The tail has a width less than the predetermined width. The tail includes a tab at a terminal end of the tail and a necked-in region extending from the tab towards the head. The tab has a width that is equal to or slightly greater than the width of the opening, and the necked-down region has a width that is less than the width of the opening. The first surface of the sheet material carries an array of hooks and the second surface of the sheet material is constructed for engagement with the hooks. The second surface of the sheet material carries an array of hook-engaging loops.

The invention also features a method of producing a plurality of fastener straps, including (a) providing a sheet material having a first surface and a second surface substantially opposite the first surface, the first surface being constructed for face-to-face cooperating engagement with the second surface; and (b) die-cutting the sheet material according to a predetermined die cut pattern, the die cut pattern defining an array of fastener straps, each strap having gain elongated body having a predetermined width, and a head portion at one end of the body having a relatively greater width and defining an opening through which the strap body can be pulled. The array of straps defines a first set of the straps and a second set of the straps, the heads of the first set being located on a first side of the array and the heads of the second set being located on a second, opposite side of the array, and the bodies of the first set being directly bordered by and parallel with the bodies of the second set, in an interdigitated arrangement.

Preferred methods include one or more of the following features. The method further includes separating the fastener straps from the array. The first surface of the sheet material carries an array of hooks and the second surface of the sheet material is constructed for engagement with the hooks. The second surface of the sheet material carries an array of hook-engaging loops. The method further includes forming the head portions by die cuts that simultaneously form portions of the bodies of adjacent straps. A terminal portion of each elongated body includes a tail having a width that is less than the predetermined width of the elongated body. The heads of the first set are directly bordered by the tails of the second set, and the tails of the first set are directly bordered by the heads of the second set. Each tail includes a tab at a terminal end of the tail and a necked-in region extending from the tab towards the head. The necked-in regions of the first set of straps are formed by die cuts that simultaneously form portions of the heads of the second sets of straps. The die cut pattern further defines a second array of fastener straps, and the second array of fastener straps is disposed in an end-to-end relationship with the first array, the two arrays defining rows of collinear fastener straps, in which, in alternating rows, the heads of the first array are directly bordered by the tails of the second array, and the tails of the first array are directly bordered by the heads of the second array.

Preferred implementations of the invention provide one or more of the following advantages. The fastener straps are cut from a sheet in a "nested" configuration that minimizes waste material. The fastener straps have a geometry that minimizes resistance to separation when the fasteners are pulled apart from the sheet. The fastener straps include a tail portion that is easily threaded through the opening. The fastener straps include a tab that may allow easy disengagement of the hook component from the loop component for removal of the fastener strap.

Other features and advantages will become apparent from the following Description of the Preferred Embodiments, the drawings and the claims.

DESCRIPTION OF EMBODIMENTS

Various preferred fastener straps are described below. These fastener straps are all self-engaging, i.e., they are formed from a sheet material that has a first surface and a second, opposite surface that is constructed to engage the first surface when the first and second surface are placed in face-to-face contact. Suitable sheet materials will be discussed in further detail below.

Figure 3:
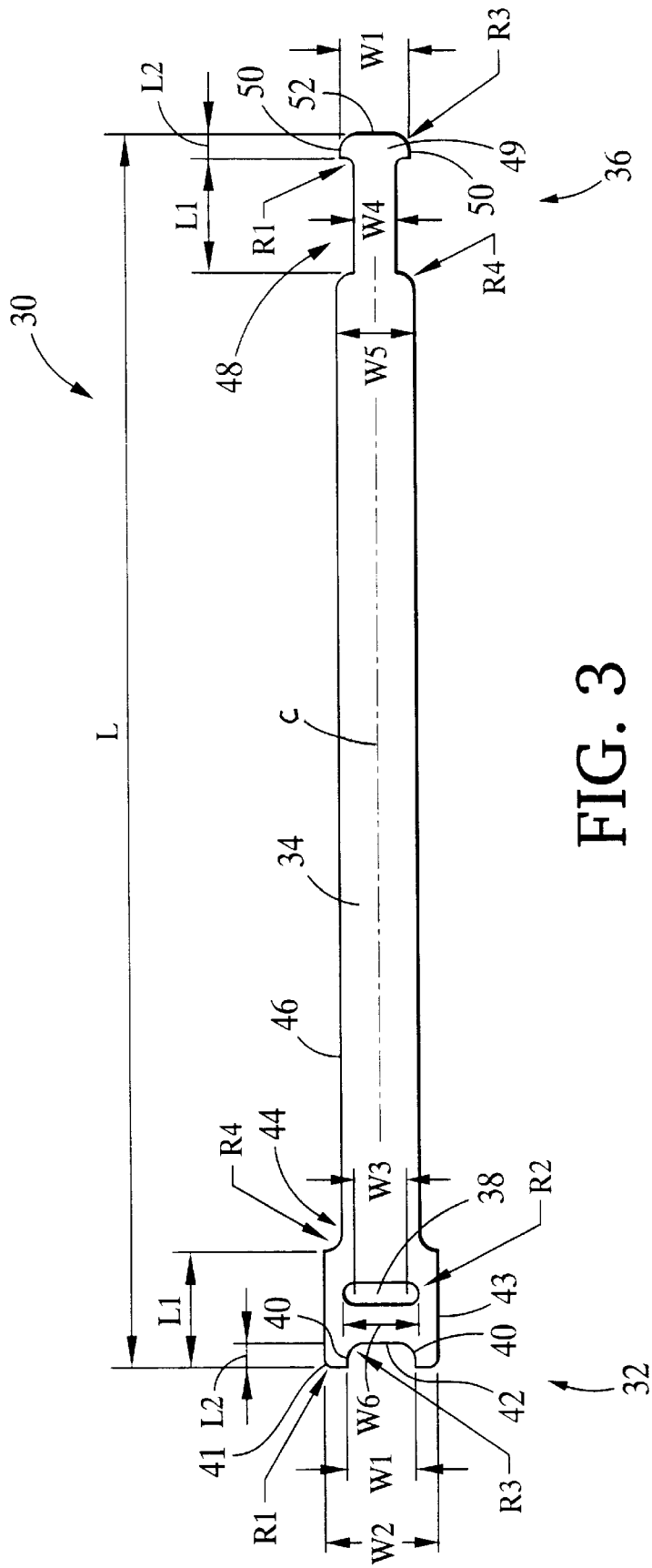
FIG. 3 is a top plan view of a fastener strap according to one embodiment of the invention.

A fastener strap 30 according to a first embodiment of the invention is shown in FIG. 3. Fastener strap 30 includes a head 32, an elongated body 34, and a tail 36.

Figure 1:
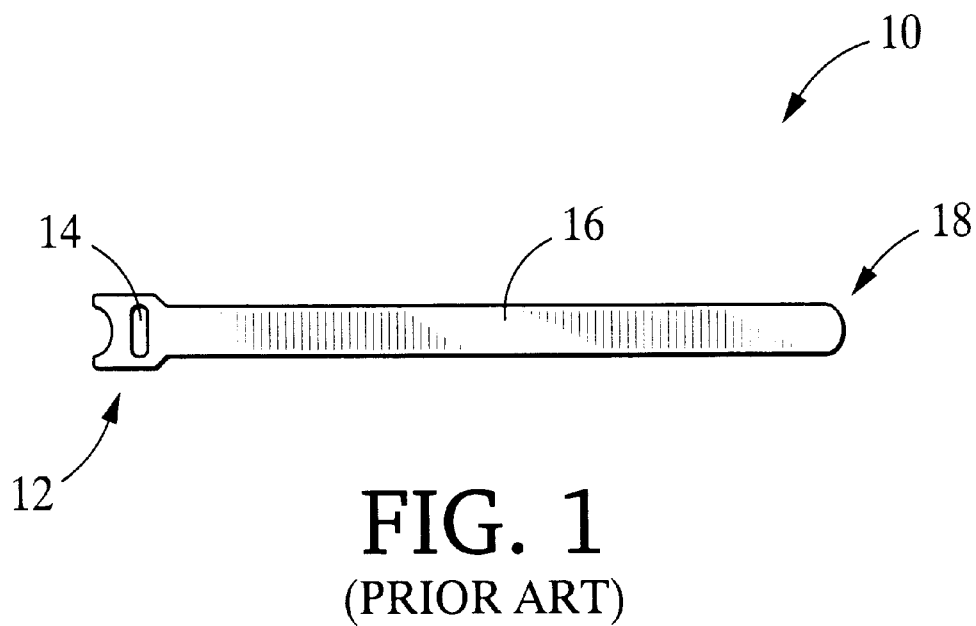
FIG. 1 a top plan view of a fastener strap according to he prior art.
Figure 1A:
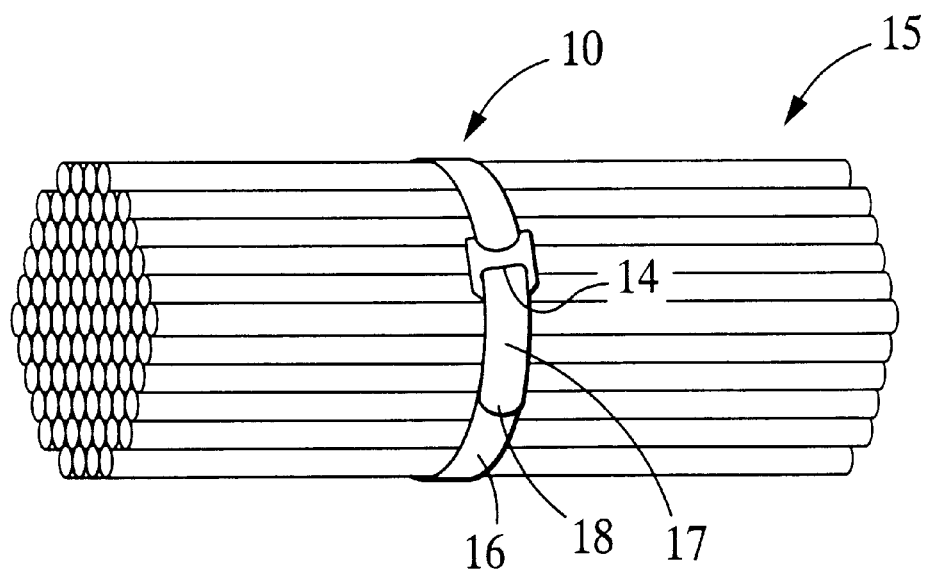
FIG. 1A is a perspective view of the fastener strap in place securing a bundle of wires.
Figure 2:
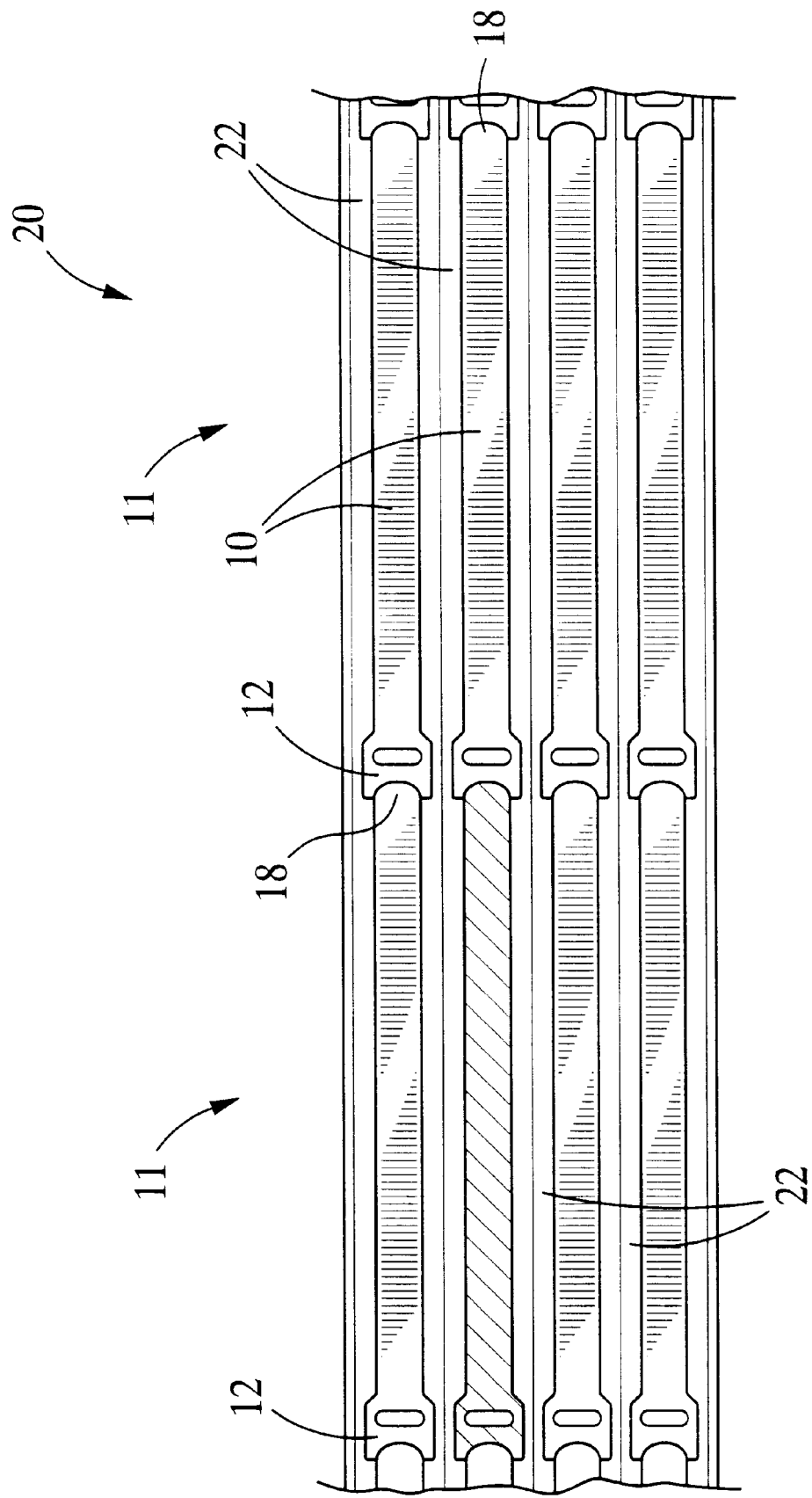
FIG. 2 is a top plan view of a die-cutting pattern according to the prior art.

Head 32 includes an elongated opening 38 for receiving tail 36. Opening 38 is substantially oval, with its curved ends having a radius of curvature R2, and is centered on the centerline C of the elongated body 34. The head 32 also includes two forward-extending ears 40 that define a substantially U-shaped edge 42 therebetween. Ears 40 have a curved outer edge 41, with radius of curvature R1, and edge 42 has a radius of curvature R3 adjacent each ear. Edge 42 has width W1. Head 32 has an overall width W2 and length L1. Ears 40 extend beyond edge 42 by a length L2. Head 32 has substantially straight edges 43, which extend to curved surfaces 44 of body 34, which curve inward to meet substantially straight edge 46 of body 34, the curve having a radius of curvature R4. Opening 38 has a width W3, excluding its curved portions, and a total width, including its curved portions, of W6. Body 34 has a width W5. Tail 36 includes a necked-in region 48 having a width W4 and length L1, and a tab 49 having a width W1 and length L2. Widths W1 and W4 are less than the width W5 of the body, making the tail 36 easier to thread through the opening, as compared to the end 18 of the prior art fastener shown in FIG. 1. Tab 49 has a substantially U-shaped head, having an edge 52 that is shaped to correspond to the shape of edge 42 of head 32. Edge 52 defines a pair of curved outer edges 50, each having a radius of curvature R3. The edge between tab 49 and necked-in region 48 has a radius of curvature R1, and the edge between necked-in region 48 and edge 46 of body 34 has a radius of curvature R4. The preferred dimensions, and relationships between the dimensions, will be discussed below.

The Dimensions L1, L2, and W1, and the radii of curvature R1, R3 and R4 are equal for the head and tail.

Figure 4:
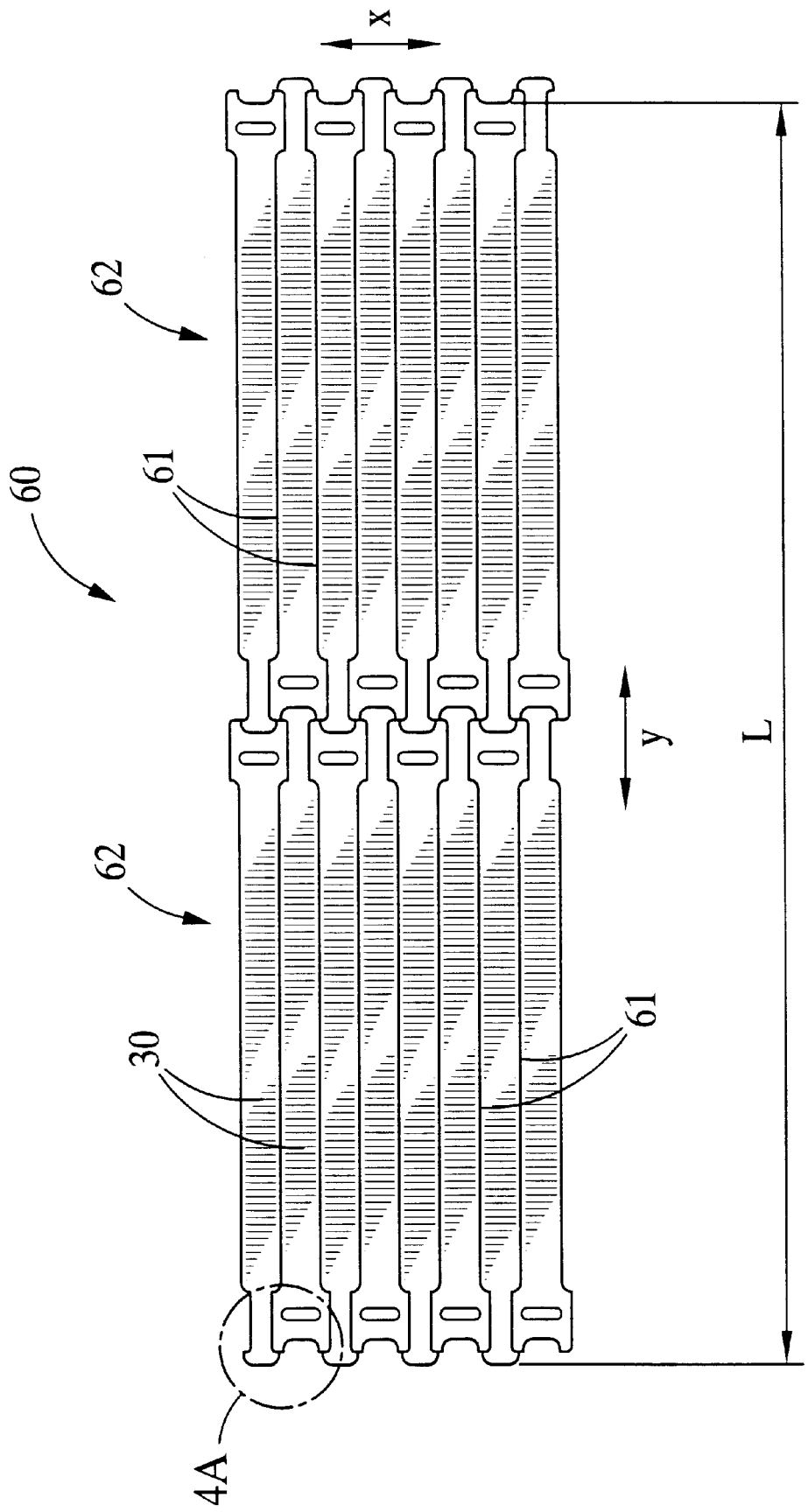
FIG. 4 is a top plan view of a die-cutting pattern for cutting the fastener strap of FIG. 3 from a sheet material.

Because L1 and R4 are equal for the head and tail, when fastener straps 30 are stacked (arrow X in FIG. 4) with edges 46 of the bodies of adjacent straps touching, the head of one fastener strap will "nest" with the tail of an adjacent fastener strap, with edge 43 of head 32 fitting into necked-in region 48 of tail 36.

Moreover, because L2, W1, R1 and R3 are equal for the head and tail, when fastener straps 30 are placed end to end (arrow Y in FIG. 4) the edge 52 of the tab end of one fastener strap will "nest" into the edge 42 of the head of the facing fastener strap.

Utilizing the "nesting" feature of the straps, a die-cutting pattern 60 (FIG. 4) can be created that will form a plurality of arrays 62 of fastener straps 30 separated by cuts 61 that are formed by die-cutting and that extend through the sheet material from which straps 30 are cut. The fastener straps in each array 62 are stacked in direction X, and the arrays are nested end-to-end in direction Y. Using die-cutting pattern 60 virtually eliminates waste material (the only wasted material being a small border around the array).

The fastener straps in each array 62 are in interdigitated arrangement, i.e., adjoining fastener straps face in opposite directions so that the head of each fastener strap is nested with the tail of each adjacent fastener strap.

The adjacent arrays together define a plurality of horizontal rows of collinear fastener straps. The fastener straps in each row are positioned head-to-tail. In other words, the adjacent arrays are positioned so that (a) each head in a given row faces in the same direction as the other head in that row, and (b) the heads in alternating rows face in opposite directions.

Figure 4A:
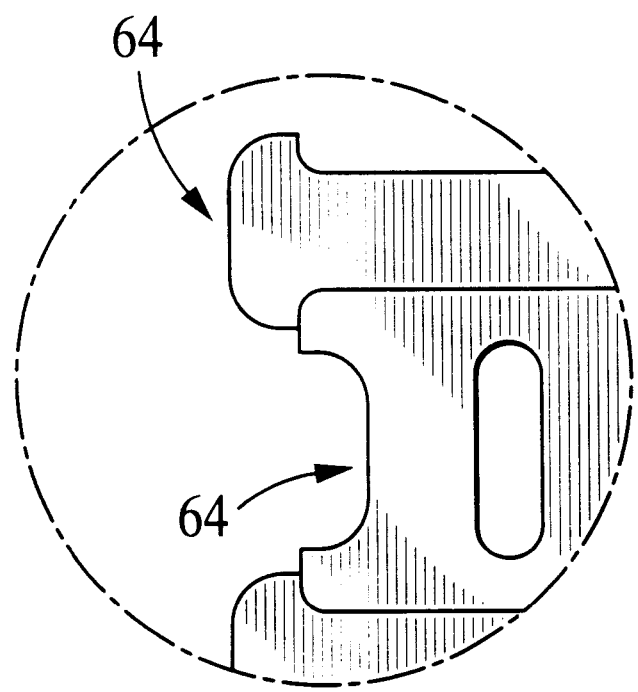
FIG. 4A is an enlarged detail view of area 4A in FIG. 4.

The heads and tails on the outer edge of each array include hold points 64, shown in FIG. 4A. Hold points 64 (which in this embodiment are discrete regions along the strap outline that are not severed by die cutting) simplify manufacturing of the straps by facilitating later separation of the straps from the sheet material by manual or automatic means. Separation can be readily accomplished by pulling and breaking the hold points under tension. This design also allows continuous die cutting, using a rotary die, in the machine direction of the oncoming web. This is desirable for productivity and strap performance, as the peel and shear strengths of the sheet material are greater in the machines direction than in the cross machine direction. Moreover, because of the arrangement of the straps and the hold points, the die cutting operation simultaneously slits between the straps in the machine direction, so that the straps can be rolled up in single-strap-wide rolls without an initial slitting step.

Preferred dimensions and relative dimensions for the fastener strap 30 are as follows: L (overall length): at least 100 mm; L1: at least 10 mm; L2: about 0 to 7 mm; W1: about 0 to W2; W2: about W5 to 60 mm; W3: about W5–2(R2); W4: W5–(W2–W5) or 2(W5)–W2; W5: at least 4 mm, and less than or approximately equal to W6; W6: approximately equal to W1; R1:0 to 0.5(W2–W1); R2:0 to 0.5(W6); R3:0 to L2. W5 is preferably slightly larger than W3, to provide a slight interference fit that makes the strap closure tighter. The compliant nature of the preferred strap materials allows the strap to fold slightly as it is drawn through the opening, allowing the strap to be tightened beyond the necked-down region. The width W5 of the strap may be significantly wider, e.g., up to 4–6 inches or more, in certain applications such as where the strap is to be used as a handle. If W5 is increased in this manner, the other dimensions would increase proportionately.

Figure 5:
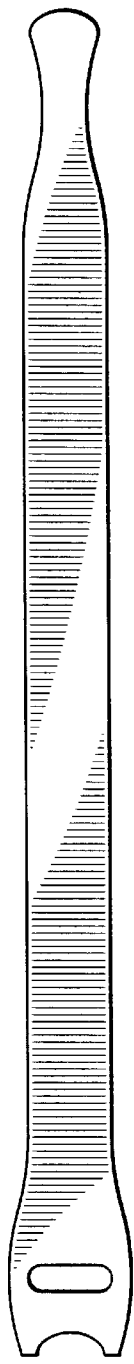
FIG. 5 is a top plan view of a fastener strap according to an alternate embodiment of the invention.

A fastener strap 66, according to a second embodiment of the invention, is shown in FIG. 5. Fastener strap 66 is similar to the fastener strap 30 shown in FIG. 3 and described above. However, fastener strap 30 has relatively sharp transitions between the head, body, necked-down region and tab, whereas the fastener strap 66 is smoothly contoured and transitions gradually between these features. The smooth contours simplify post-die-cutting processing of the straps. Subsequent processing typically involves winding and packaging small rolls from a set of "mother" rolls, that are wound up after die-cutting. The smooth edges of the fastener strap 66 tend not to get caught up on the processing equipment used for these steps, preventing premature breaking of the hold points. As a result, the hold points can be made smaller, for a more customer-friendly product.

Figure 6:
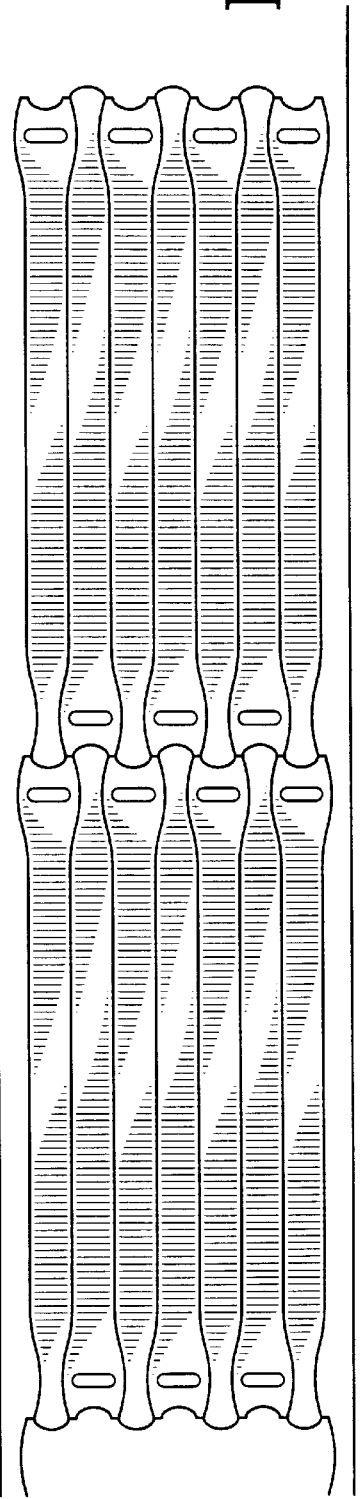
FIG. 6 is a top plan view of a die-cutting pattern for cutting the fastener strap of FIG. 5 from a sheet material.

Like the fastener strap 30, fastener strap 66 can be nested with adjacent fastener straps and cut using a die pattern defining arrays of nested fastener straps. A suitable die cutting pattern 68 is shown in FIG. 6.

Die cutting patterns 60 and 68 are shown as examples only. Any number of straps may be nested side by side, limited only by the available width of the incoming sheet material and the capabilities of the processing equipment.

Figure 5A:
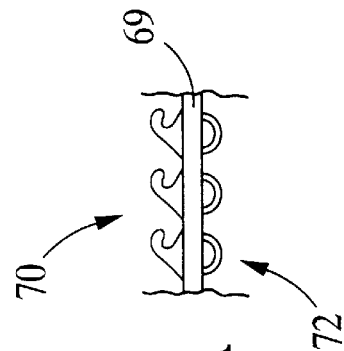
FIG. 5A is a highly enlarged detail side view of a portion of FIG. 5.

As mentioned above, the fastener straps of the invention are formed of a sheet material that has a first surface and a second, opposite surface that is constructed to engage the first surface when the first and second surface are placed in face-to-face contact. Suitable sheet materials include those that have a base 69 carrying an array of hook elements 70 on a first surface and an array of loop elements 72 on the opposite surface, as shown in FIG. 5A. Other suitable sheet materials have an array of hook elements on one surface, and a hook-engageable material, such as that described in copending U.S. Ser. No. 08/922,292, filed Sep. 3, 1997, on the other surface. Suitable sheet materials can be manufactured by the process described in U.S. Pat. No. 5,260,015, the disclosure of which is incorporated by reference herein, or by other techniques. A particularly preferred sheet material is a flexible material with hook elements having a height of from about 0.005 to 0.100 inches on one surface, and a suitable loop material into which the hooks readily engage on the other surface.

Figure 7:
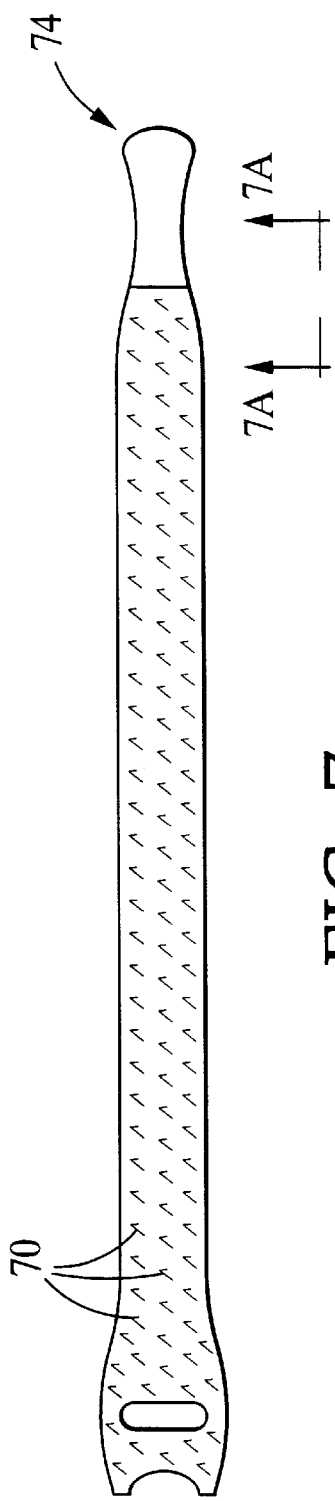
FIG. 7 is a top plan view of a fastener strap according to yet another embodiment of the invention, with hook elements shown highly enlarged for purposes of explanation.
Figure 7B:
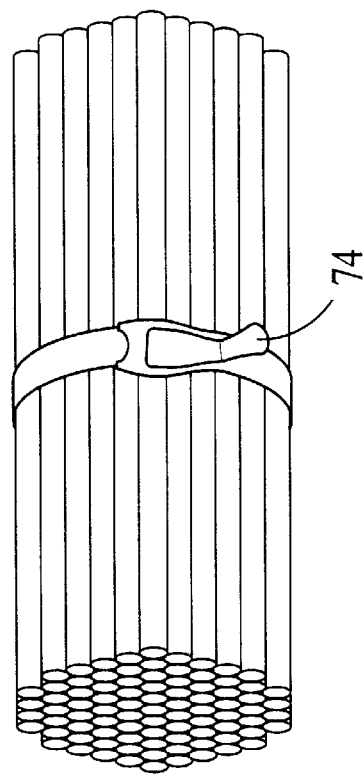
FIG. 7B is a perspective view of the fastener strap of FIG. 7 wrapped around an article.
Figure 7A:
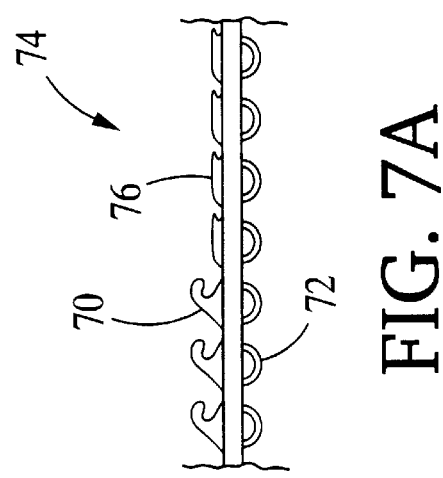
FIG. 7A is a highly enlarged detail side view of the strap of FIG. 7, taken from direction 7A—7A.

In some cases, it may be difficult to disengage the fastener strap after it has been engaged, due to the difficulty of grasping the tail which is secured to the underlying strap body. To address this difficulty, the fastener strap may be provided with a non-engaging portion 74, as shown schematically in FIG. 7. Referring to FIGS. 7 and 7A, the major portion of the fastener strap includes hook elements 70, as described above. The non-engaging portion 74, however, is substantially free of hook elements. This may be due to the hook elements having been flattened, as shown in FIG. 7A (flattened hooks 76), or to the hook elements being scraped off or removed by other means, e.g., mechanical, ultrasonic or heat. Alternatively, the sheet material may be molded to include areas that are free of hook elements. As shown in FIG. 7B, when the fastener strap is fastened, non-engaging portion 74 will not adhere to the underlying strap body, but will instead extend freely. Thus, to disengage the fastener strap a user need only grasp the non-engaging portion 74 and pull the engaged strap portions apart. Preferably, the length of the non-engaging portion 74 is from about 5 to 15% of the overall length L of the fastener strap.

To manufacture the fastener straps of the invention, a sheet material is provided, and arrays of fastener straps are die cut using a pattern such as those discussed above. After die-cutting, if the fastener straps are to be sold individually (rather than as a sheet), the fastener straps are separated from the sheet using a manual or automatic blocking system which winds up each row of straps (held together in the machine direction by the hold points) into spools.

Other embodiments are within the claims. For example, the sheet material of which the fastener straps are formed may provide a means for face-to-face cooperating engagement other than hook and loop fastening, e.g., one surface may carry a pressure sensitive adhesive and the other surface be formed of a material that the pressure sensitive adhesive will adhere to.

Moreover, the opening through which the strap is threaded could be circular, rather than oval, or could have any desired shape that will allow the tail to be threaded through the opening.

What is claimed is:

1. A fastener strap sheet comprising:

a sheet material having a first surface and a second surface substantially opposite the first surface, said first surface being constructed for face-to-face cooperating engagement with said second surface; and a pattern of cuts extending through said sheet material, said cuts defining a first array of fastener straps and a second array of fastener straps, each fastener strap including an elongated body having a predetermined width, and a head portion at one end of the body having a width greater than said predetermined width and defining an opening through which the strap body can be pulled, wherein a terminal portion of each said elongated body includes a tail having a width that is less than the predetermined width of said elongated body, the first array of straps defining a first set of straps and a second set of straps, the head portions of the first set being located on a first side of the array and the head portions, of the second set being located on a second, opposite side of the array, the head portions of said first set are directly bordered by the tails of said second set and the tails of said first set are directly bordered by the head portions of said second set, and the bodies of the first set being directly bordered by and parallel with the bodies of the second set, in an interdigitated arrangement, and said second array of fastener straps being disposed in an end-to-end relationship with said first array, the two arrays defining rows of collinear fastener straps, in which, in alternating rows, the heads of the first array are directly bordered by the tails of the second array, and the tails of the first array are directly bordered by the heads of the second array.

2. The fastener strap sheet of claim 1 wherein each fastener strap has smoothly contoured transitions between the head portion, tail, necked-in region and tab.

3. The fastener strap sheet of claim 1 wherein each tail includes a tab at a terminal end of the tail and a necked-in region extending from the tab towards the head.

4. The fastener strap sheet of claim 1 wherein said first surface of said sheet material carries an array of hooks and said second surface of said sheet material is constructed for engagement with said hooks.

5. The fastener strap sheet of claim 4 wherein said second surface of said sheet material carries an array of hook-engaging loops.

6. A fastener strap comprising:

a portion of sheet material having a first surface and a second surface substantially opposite the first surface, said first surface bearing constructed for face-to-face cooperating engagement with said second surface, said first surface carrying an array of hooks and said second surface being constructed for engagement with said hooks, the sheet material being shaped to define:

an elongated body having a predetermined width;

a head portion at one end of the body having a width greater than said predetermined width, and defining an opening through which the strap body can be pulled; and a tail portion at an opposite end of the body, having a width less than said predetermined width, said tail being dimensioned for insertion through said opening.

7. The fastener strap of claim 6 wherein said tail includes a tab at a terminal end of the tail and a necked-in region extending from the tab towards the head portion.

8. The fastener strap of claim 7 wherein the fastener strap has smoothly contoured transitions between the head portion, tail, necked-in region and tab.

9. The fastener strap of claim 7, wherein said tab has a width that is equal to or slightly greater than the width of said opening, and said necked-down region has a width that is less than the width of said opening.

10. The fastener strap of claim 7 wherein said second surface of said sheet material carries an array of hook-engaging loops.

11. A fastener strap comprising:

a portion of sheet material having a first surface and a second surface substantially opposite the first surface, said first surface being constructed for face-to-face cooperating engagement with said second surface, said first surface carrying an array of hooks and said second surface being constructed for engagement with said hooks, the sheet material being shaped to define:

an elongated body having a predetermined width;

a head portion at one end of the body having a width greater than said predetermined width, and defining an opening through which the strap body can be pulled; and a tail at an opposite end of the body, said tail having a width less than said predetermined width, being dimensioned for insertion through said opening, and including a region of said sheet material that has been rendered incapable of face-to-face cooperating engagement with the opposite surface of the sheet material.

12. The fastener strap of claim 11 wherein said region is constructed to be grasped by a user to facilitate disengagement of said first surface of said sheet material from said second surface when the two surfaces are in face-to-face engagement.

13. The fastener strap of claim 11 wherein said tail includes a tab at a terminal end of the tail and a necked-in region extending from the tab towards the head portion.

14. The fastener strap of claim 13 wherein the fastener strap has smoothly contoured transitions between the head portion, tail, necked-in region and tab.

15. The fastener strap of claim 13, wherein said tab has a width that is equal to or slightly greater than the width of said opening, and said necked-down region has a width that is less than the width of said opening.

16. The fastener strap of claim 11 wherein said second surface of said sheet material carries an array of hook-engaging loops.

17. A method of producing a plurality of fastener straps, comprising (a) providing a sheet material having a first surface and a second surface substantially opposite the first surface, said first surface being constructed for face-to-face cooperating engagement with said second surface, said first surface of said sheet material carrying an array of hooks and said second surface of said sheet material being constructed for engagement with said hooks; and (b) die-cutting the sheet material according to a predetermined die cut pattern, the die cut pattern defining an array of fastener straps, each strap having an elongated body having a predetermined width, and a head portion at one end of the body having a relatively greater width and defining an opening through which the strap body can be pulled, the array of straps defining a first set of said straps and a second set of said straps, the head portions of the first set being located on a first side of the array and the head portions of the second set being located on a second, opposite side of the array, and the bodies of the first set being directly bordered by and parallel with the bodies of the second set, in an interdigitated arrangement.

18. The method of claim 17 further comprising separating the fastener straps from said array.

19. A method of producing a plurality of fastener straps, comprising
   (a) providing a sheet material having a first surface and a second surface substantially opposite the first surface, said first surface being constructed for face-to-face cooperating engagement with said second surface; and
   (b) die-cutting the sheet material according to a predetermined die cut pattern, the die cut pattern defining a first array of fastener straps and a second array of fastener straps, each strap having an elongated body having a predetermined width, and a head portion at one end of the body having a relatively greater width and defining an opening through which the strap body can be pulled, the array of straps defining a first set of said straps and a second set of said straps, the head portions of the first set being located on a first side of the array and the head portions of the second set being located on a second, opposite side of the array, and the bodies of the first set being directly bordered by and parallel with the bodies of the second set, in an interdigitated arrangement,
   said second array of fastener straps being disposed in an end-to-end relationship with said first array, the two arrays defining rows of collinear fastener straps, in which, in alternating rows, the head portions of the first array are directly bordered by the tails of the second array, and the tails of the first ay are directly bordered by the head portions of the second array.

20. The method of claim 17 wherein said second surface of said sheet material carries an array of hook-engaging loops.

21. The method of claims 19 further comprising forming the head portions by die cuts that simultaneously form portions of the bodies of adjacent straps.

22. The method of claim 19 wherein a terminal portion of each said elongated body includes a tail having a width that is less than the predetermined width of said elongated body.

23. The method of claim 22 wherein the head portion of said first set are directly bordered by the tails of said second set, and the tails of said first set are directly bordered by the head portions of said second set.

24. The method of claim 19 wherein each tail includes a tab at a terminal end of the tail and a necked-in region extending from the tab towards the head portion.

25. The method of claim 24 wherein the necked-in regions of the first set of straps are formed by die cuts that simultaneously form portions of the head portions of the second sets of straps.

26. The method of claim 24 wherein each fastener strap has smoothly contoured transitions between the head portion, tail, necked-in region and tab.

27. The method of claim 26 wherein the smoothly contoured transitions are constructed to prevent catching edges of the straps during post-diecutting strap processing.

28. The method of claim 17 wherein said die cut pattern further defines a second array of fastener straps, each strap having an elongated body having a predetermined width, and a head portion at one end of the body having a relatively greater width and defining an opening through which the strap body can be pulled, and said second array of fastener straps are disposed in an end-to-end relationship with said first array, the two arrays defining rows of collinear fastener straps, in which, in alternating rows, the head portions of the first array are directly bordered by the tails of the second array, and the tails of the first array are directly bordered by the head portions of the second array.

29. The fastener strap sheet of claim 1 wherein each fastener strap has smoothly contoured transitions between the head portion and the elongated body.

30. A fastener strap sheet comprising:
   a sheet material having a first surface and a second surface substantially opposite the first surface, said first surface being constructed for face-to-face cooperating engagement with said second surface, said first surface carrying an array of hooks and said second surface carrying an array of hook-engaging loops constructed for engagement with said hooks; and
   a pattern of cuts extending through said sheet material, said outs defining an array of fastener straps, each fastener strap including an elongated body having a predetermined width, and a head portion at one end of the body having a width greater than said predetermined width and defining an opening through which the strap body can be pulled,
   the array of straps defining a first set of straps and a second set of straps, the head portions of the first set being located on a first side of the array and the head portions of the second set being located on a second, opposite side of the array, and the bodies of the first set being directly bordered by and parallel with the bodies of the second set, in an interdigitated arrangement.

* * * * *